United States Patent [19]

Patterson, Jr.

[11] 3,984,070
[45] Oct. 5, 1976

[54] WINGTIP VORTEX DISSIPATOR FOR AIRCRAFT

[75] Inventor: James C. Patterson, Jr., Yorktown, Va.

[73] Assignee: The United States of America as represented by the Administrator of the National Aeronautics and Space Administration, Washington, D.C.

[22] Filed: May 28, 1974

[21] Appl. No.: 473,973

[52] U.S. Cl. .................................. 244/130; 244/113
[51] Int. Cl.² ............................................ B64D 47/00
[58] Field of Search ............... 244/130, 40 R, 40 A, 244/41, 42 DC, 110 D, 113, 1 TD

[56] References Cited
UNITED STATES PATENTS

| | | | |
|---|---|---|---|
| 2,075,817 | 4/1937 | Loerke | 244/130 |
| 2,421,870 | 6/1947 | Dornier et al. | 244/113 |
| 2,612,332 | 9/1952 | Drozinski | 244/113 |
| 2,678,785 | 5/1954 | Graham | 244/113 |
| 3,596,854 | 8/1971 | Haney | 244/40 A |
| 3,881,669 | 5/1975 | Lessen | 244/130 X |

FOREIGN PATENTS OR APPLICATIONS

| | | | |
|---|---|---|---|
| 1,564,026 | 4/1969 | France | 244/40 R |
| 1,209,801 | 3/1960 | France | 244/130 |

*Primary Examiner*—Trygve M. Blix
*Assistant Examiner*—Barry L. Kelmachter
*Attorney, Agent, or Firm*—Howard J. Osborn; John R. Manning

[57] ABSTRACT

A means for attenuating the vortex created at aircraft wingtips which consists of a retractable planar surface transverse to the airstream and attached downstream of the wingtip which creates a positive pressure gradient just downstream from the wing. The positive pressure forces a break up of the rotational air flow of the vortex.

12 Claims, 4 Drawing Figures

WINGTIP VORTEX DISSIPATOR FOR AIRCRAFT

ORIGIN OF THE INVENTION

The invention described herein was made by an employee of the U.S. Government and may be manufactured and used by or for the Government for governmental purposes without payment of any royalties thereon or therefor.

BACKGROUND OF THE INVENTION

This invention relates generally to aircraft aerodynamics and specifically to a method and apparatus for attenuating the airstream vortex generated at the wingtips of aircraft.

The lift-induced wingtip vortex associated with large jet aircraft has become a major problem to the air traffic controller as well as an unseen hazard to smaller aircraft. The problem arises from the fact that the vortex created by large aircraft is very strong and of such long persistence and that it intensifies as the weight of the aircraft increases. The rotational airflow or vortex developed at or near the wingtip of an aircraft remains essentially stationary in space and induces a rolling moment on smaller following aircraft if encountered. This rolling moment can be so strong that it surpasses the limits of control of the smaller aircraft and such loss of control has been proven to occur as far as 4 miles behind a large aircraft. The vortex problem is particularly severe in flight paths around major airports where smaller aircraft are most likely to follow large aircraft and where the small aircraft has little altitude in which to regain control.

Previous attempts to limit the vortex effect have generally been unsuccessful either because, as with wing end plates or wingtip extensions, the devices did not sufficiently modify the far downstream effects of the vortex or, as with landing flap variations and wing spoilers, the vortex attenuation caused too great a lift loss for the aircraft.

SUMMARY OF THE INVENTION

The present invention breaks up the rotational flow of the vortex and thus largely eliminates the danger of the otherwise stationary vortex remaining to disturb the flight of following aircraft. This is accomplished by changing the airflow pattern in the region of the aircraft wingtip in such a manner that the rotation airflow of the vortex is destroyed by linear airflow around it and through the vortex core. The most basic device to accomplish such a disturbance to the vortex is the use of a decelerating chute at each wingtip of the aircraft. Such chutes cause a positive pressure gradient just downstream of the aircraft wingtip, in effect pushing a mass of air ahead of each chute and therefore disturbing the vortex airflow just ahead of the chute and just behind the wingtip. The shearing stresses set up between the mass of air forced forward by the chute and the rotational flow of the vortex itself plus the interruption of the axial flow in the vortex core cause the vortex to dissipate. The decelerating chute is, by its nature, a device which is difficult to use and then retract. While the drogue device as deployed in the invention does not affect aircraft lift any such device which disturbs the airstream sufficiently to dissipate the vortex also causes a drag which lowers the aircraft efficiency. It is therefore desirable to strike a compromise and to use the vortex attenuation only where the severity of the problem is the greatest hindrance to air traffic, such as near airports. Such a compromise requires a device which can be retracted and deployed at will and it is for that function that the rigid spline configuration is preferred.

The spline drogue device is a multiple spline device which is essentially several plates extending windmill fashion from a central core. The plates, however, differ from a windmill in that they are rigidly held exactly transverse to the airstream in order to maximize the airstream disturbance. Theoretically the drogue device can be a complete circular surface similar to a drogue chute, but for purposes of construction and retractability the spline structure is used. Moreover, the effect on the vortex is essentially the same as a complete circular surface. The effectiveness of this device is a function of its area and the location of this area relative to the vortex. The spline configuration was chosen to distribute the required minimum area for effective vortex dissipation over the largest expanse. This minimum area is approximately that which results from a drogue configuration diameter of 60 percent of the mean geometric chord of the aircraft wing and an individual spline width of 15% of the configuration diameter.

Since the formation of a vortex is associated with the lift change at the wingtip, the drogue device should be located at or near the wingtip. For a tapered and swept wing, the vortex generally forms at 80 to 90 percent of the semispan location and the drogue device should be located accordingly. In a particular aircraft, structural considerations such as wing flap configuration may force some compromise with the ideal location.

The drogue device is mounted downstream of the trailing edge of the wingtip by use of a probe configuration. The probe is used to house the retracting mechanism so that when not in use, each blade of the drogue device collapses to form a streamlined configuration in conjunction with the probe. The position of the drogue device downstream of the wing trailing edge is determined by minimizing the detrimental effect on aircraft lift. A typical spacing between the wing trailing edge and the drogue device which accomplishes this is approximately the diameter of the drogue device.

An alternate device for mass injection into the vortex creating the associated positive pressure gradient downstream from the wingtip which differs from the drogue device is the wing-tip mounted jet engine. This engine creates a similar airstream disturbance which attenuates the vortex. Since the tip mounted engine requires a high trust, it is more appropriate for use on new aircraft designs than for a retrofit application as is the drogue device.

It should be noted, however, that the drogue device, when properly designed, and particularly in a new aircraft design, could serve both as vortex attenuation and as a decelerating device to achieve more rapid descent during landing approaches. Moreover, a combination of drogue deployment and engine thrust variation can be programed on the landing approach to optimize both functions.

DETAILED DESCRIPTION OF THE INVENTION

Figure 1:
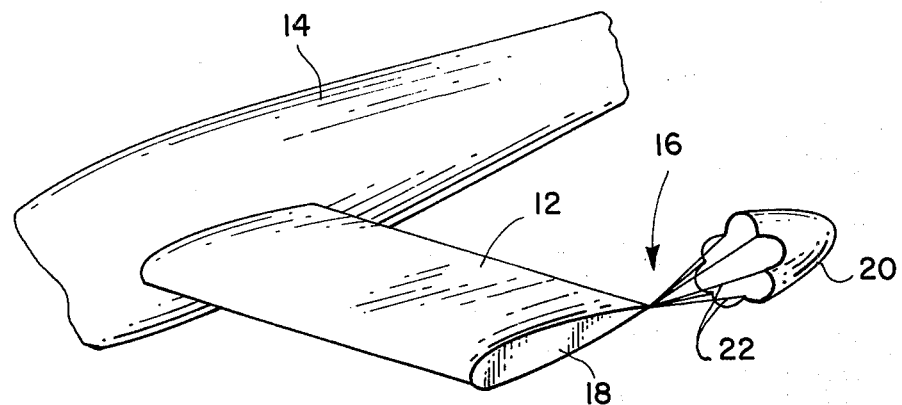
FIG. 1 is a perspective view of the drogue chute embodiment of the invention.

A basic understanding of the invention can best be accomplished by reference to FIG. 1 which depicts the drogue chute embodiment of the invention. FIG. 1 shows a simplified wing structure 12 attached to aircraft fuselage 14. The wingtip vortex is generated approximately in area 16 due to the aerodynamic effects of the discontinuity of lift caused by the termination of wing 12 at wingtip 18. Drogue chute 20 attached to wingtip 18 by lines 22 cause a positive pressure gradient in area 16 while the aircraft is in flight essentially because of the drag effects of any nonaerodynamic shaped body. This positive pressure gradient in area 16 dissipates the rotational vortex airflow caused by the lift discontinuity by forcing linear airflow through and around the vortex core.

STRUCTURE OF THE PREFERRED EMBODIMENT

Figure 2:
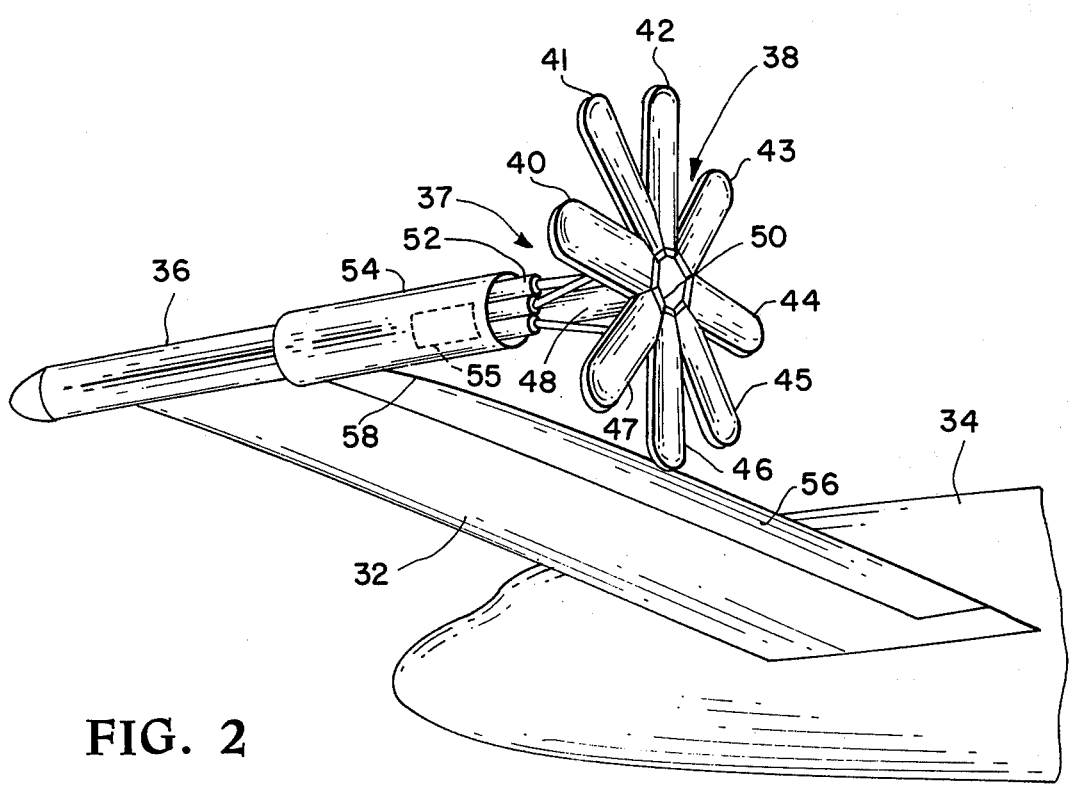
FIG. 2 is a perspective view of the preferred embodiment of the invention.

The preferred embodiment functions to dissipate the vortex in the same manner as the drogue chute. However, the structure differs in that the preferred embodiment is a structural configuration, as shown in FIG. 2, designed to be deployed or retracted as the flight requires.

Figure 3:
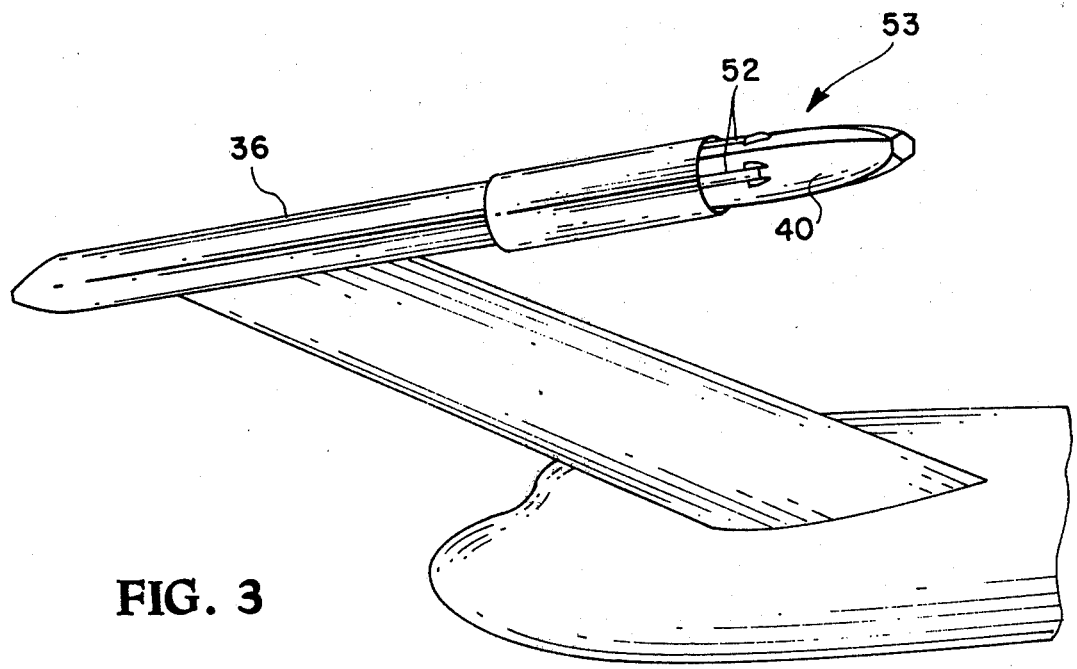
FIG. 3 is a perspective view of the preferred embodiment fully retracted.

To the simplified wing structure 32, attached to aircraft fuselage 34, is added aerodynamic probe 36. At the downstream end 37 of probe 36 is deployed spline configuration 38 composed of individiual plates 40, 41, 42, 43, 44, 45, 46 and 47. Each individual plate has a configuration so that it may be folded at hinge 50 which is mounted upon core 48 when moved by actuator 52. The actuators may be of the fluid energized type with appropriate linkage connected to the plates, this structure being of conventional design. The configuration of plates closes up flower petal-like toward the rear of the probe 36 when actuated to form an integral aerodynamic shape 53 with probe 36 as shown in FIG. 3. Cover 54 moved by cover actuator 55, which may be a prime mover with appropriate linkage shown schematically, slides over the array of actuators to maintain the aerodynamic surface.

The location of spline structure 38 is determined by the actual point of final roll-up of the vortex and the structure of aircraft wing 32. Ideally, spline structure 38 should be mounted exactly at the center of the vortex roll-up as determined by model aircraft experimentation, which on a typical tapered wing would be at 80 to 90% of the semispan. However, structural considerations such as the location of aileron 56 in FIG. 2 may force a less than ideal location on an existing aircraft to which the invention is to be retrofitted.

Spline structure 38 should be mounted downstream of trailing edge 58 a distance sufficient to prevent any detrimental effect upon the aircraft lift. Typically this distance is approximately equal to the diameter of the spline configuration.

The effectiveness of the invention in dissipation of the vortex is directly affected by the area of the flat plate surface of the structure. The minimum area for effective dissipation of the typical vortex has been experimentally determined to be the area of a spline configuration of eight plates whose widths are 15% of the configuration diameter and whose configuration diameter is 60% of the mean geometric chord of the aircraft.

Operation of the preferred embodiment has been experimentally flight tested with excellent results. A Douglas C-54 aircraft with a spline structure on each wingtip has been flown in such experiments trailed by a Piper Cherokee chase aircraft to note the effects of the vortex on the control characteristic of a following aircraft. Without the invention the chase aircraft was rolled 180°, despite attempts to control it, when approximately four nautical miles behind the test aircraft. With the spline structure installed, the case aircraft was able to maintain control as close as one-half nautical mile. Visual tests of the vortex of the C-54 aircraft made by the use of air-dispersed powder indicate the typical vortex has a diameter of two to three-feet, but that the vortex on aircraft with spline structures installed is dissipated to a diameter of 60 to 80 feet. Rolling moment coefficient measurements on the chase aircraft indicate reductions of approximately 55% for the spline configuration. All the tests indicate that the spline configuration reduces the effects of the vortex to a point where it can be considered nonhazardous to smaller following aircraft.

Figure 4:
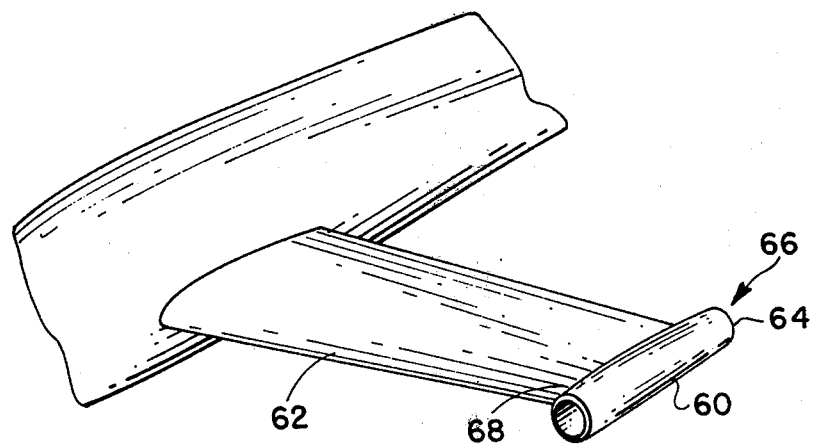
FIG. 4 is a perspective view of the jet-engine embodiment of the invention.

An alternate embodiment of the invention is shown in FIG. 4. In such an embodiment jet engine 60 is mounted on wing 62 in a similar manner as the preferred embodiment in the vicinity of wing tip 68. Since the jet engine exhaust produces a positive pressure gradient at its exit 64 which is adjacent to the vortex origin area 66, this positive pressure dissipates the vortex in the same manner as a drogue device. This embodiment, being a more complex system, is more appropriate for original aircraft designs than for retrofit application, but it has the advantage of yeilding additional trust for flight as opposed to causing airstream drag.

It is to be understood that the forms of the invention herein shown are merely preferred embodiments. Various changes may be made in shape, size and the arrangement of parts; equivalent means may be substituted for those illustrated and described; and certain features may be used independently from other features without departing from the spirit and scope of the invention as defined in the following claims.

For example, the spline configuration shown may be constructed of more or fewer plates of different shapes, or the location of the invention on the aircraft wing may be varied as the aircraft structure requires.

What is claimed as new and desired to be secured by Letters Patent of the United States is:

1. An apparatus for dissipating a lift-induced vortex generator by an airstream flowing past an aircraft wing having a leading edge and a trailing edge comprising: a positive pressure gradient producing means; said gradient producing means being a drogue structure having a surface transverse to the airstream, and an attachment means of aerodynamic design which attaches said drogue structure downstream of the origin of the vortex.

2. An apparatus for dissipating an aircraft lift-induced vortex as in claim 1 wherein the attachment means includes deployment means for selectively deploying and retracting the drogue structure.

3. An apparatus for dissipating an aircraft lift induced vortex as in claim 1 wherein the drogue structure is a drogue chute.

4. An apparatus for dissipating an aircraft lift-induced vortex as in claim 1 wherein the drogue structure is a spline configuration of plates which simulate a planar surface.

5. An apparatus for dissipating an aircraft lift-induced vortex as in claim 1 wherein the drogue structure has a diameter at least 60% of the mean distance between the leading edge and the trailing edge of the aircraft wing.

6. An apparatus for dissipating an aircraft lift-induced vortex as in claim 1 wherein the drogue structure is mounted downstream of the wing trailing edge a distance approximating the diameter of the drogue structure.

7. An apparatus for dissipating an aircraft lift-induced vortex as in claim 5 wherein the drogue structure is mounted downstream of the wing trailing edge a distance approximating the diameter of the drogue structure.

8. An apparatus for dissipating an aircraft lift-induced vortex as in claim 2 wherein the drogue structure is a spline configuration of plates which simulate a planar surface and wherein each plate is retractable.

9. An apparatus for dissipating an aircraft lift-induced vortex as in claim 8 wherein the configuration of plates is shaped to form a unitary aerodynamic surface with the attachment means when the configuration of plates is retracted.

10. An apparatus for dissipating an aircraft lift-induced vortex as in claim 2 wherein the drogue structure is a spline configuration of plates which simulate a planar surface, and wherein each plate is hinged; and wherein the deployment means is an array of actuator means.

11. An apparatus for dissipating an aircraft lift-induced vortex as in claim 10 wherein the configuration of plates is shaped to form a unitary aerodynamic surface with the attachment means when the configuration of plates are folded down.

12. An apparatus for dissipating an aircraft lift-induced vortex as in claim 2 including means for covering said deployment means to provide an aerodynamically clean surface when not deployed.

* * * * *